United States Patent
Narushima et al.

(10) Patent No.: US 8,024,622 B2
(45) Date of Patent: Sep. 20, 2011

(54) ABNORMALITY DETECTION FREQUENCY SET WHEN IT IS INDICATED THAT ABNORMALITY WILL OCCUR

(75) Inventors: Kazuhiko Narushima, Kanagawa (JP); Shigekazu Yamagishi, Kanagawa (JP); Makoto Hashimoto, Kanagawa (JP); Ken Ikeda, Kanagawa (JP); Masafumi Ono, Kanagawa (JP); Hinki Ryu, Kanagawa (JP); Kenji Kuroishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 184 days.

(21) Appl. No.: 12/560,460

(22) Filed: Sep. 16, 2009

(65) Prior Publication Data
US 2010/0223507 A1 Sep. 2, 2010

(30) Foreign Application Priority Data
Mar. 2, 2009 (JP) .................................. 2009-048031

(51) Int. Cl.
*G06F 11/00* (2006.01)
(52) U.S. Cl. ........................................ 714/47.3; 714/22
(58) Field of Classification Search .................. None
See application file for complete search history.

(56) References Cited

U.S. PATENT DOCUMENTS

| 5,940,582 | A * | 8/1999 | Akabori et al. ............... 358/1.13 |
| 6,449,663 | B1 * | 9/2002 | Carney et al. .................... 710/15 |
| 6,771,440 | B2 * | 8/2004 | Smith ............................... 360/31 |
| 6,775,841 | B1 * | 8/2004 | Wellington ..................... 725/111 |
| 7,124,329 | B2 * | 10/2006 | Ackaret et al. ................... 714/42 |
| 2002/0042896 | A1 * | 4/2002 | Johnson et al. .................. 714/47 |
| 2002/0083169 | A1 * | 6/2002 | Aki et al. ....................... 709/224 |
| 2002/0183972 | A1 * | 12/2002 | Enck et al. .................... 702/186 |
| 2003/0225880 | A1 * | 12/2003 | Srivastava et al. ............. 709/224 |
| 2004/0025099 | A1 * | 2/2004 | Aikawa et al. ................. 714/748 |
| 2005/0119996 | A1 * | 6/2005 | Ohata et al. ........................ 707/3 |
| 2005/0160299 | A1 * | 7/2005 | Nachamiev et al. .......... 713/300 |
| 2006/0098251 | A1 * | 5/2006 | Eklund et al. ................. 358/504 |

FOREIGN PATENT DOCUMENTS
JP 10-254309 A 9/1998
JP 2003-154739 A 5/2003
* cited by examiner Primary Examiner — Gabriel L Chu
(74) Attorney, Agent, or Firm — Sughrue Mion, PLLC (57) ABSTRACT

The invention provides an information processing apparatus including: a plurality of abnormality detection sections provided in each of a plurality of detection target portions, that detect an abnormality caused by high temperature at a predetermined first frequency; an indication detecting section that detects an indication that the abnormality will occur; and a controller that controls to set the detection frequency of the plurality of abnormality detection sections to a second frequency which is higher than the first frequency, when the number of times that the indication is detected within a predetermined period is more than a predetermined number of times.

8 Claims, 10 Drawing Sheets

ABNORMALITY DETECTION FREQUENCY SET WHEN IT IS INDICATED THAT ABNORMALITY WILL OCCUR

CROSS-REFERENCE TO RELATED APPLICATION

This application is based on and claims priority under 35 USC 119 from Japanese Patent Application No. 2009-048031 filed Mar. 2, 2009.

BACKGROUND

Technical Field

The present invention relates to an information processing apparatus, a method for controlling the information processing apparatus, and a computer readable medium that stores a program.

SUMMARY

According to an aspect of the invention, there is provided an information processing apparatus including: a plurality of abnormality detection sections provided in each of a plurality of detection target portions, that detect an abnormality caused by high temperature at a predetermined first frequency; an indication detecting section that detects an indication that the abnormality will occur; and a controller that controls to set the detection frequency of the plurality of abnormality detection sections to a second frequency which is higher than the first frequency, when the number of times that the indication is detected within a predetermined period is more than a predetermined number of times.

BRIEF DESCRIPTION OF THE DRAWINGS

Exemplary embodiments of the present invention will be described in detail based on the following figures, wherein.

DETAILED DESCRIPTION

Herebelow, an example of exemplary embodiments of the present invention will be described below in detail with reference to the drawings. The exemplary embodiments which are applied to an image forming apparatus having a copy function, a printing function and a facsimile function, will be described below.

First Exemplary Embodiment

Figure 1:
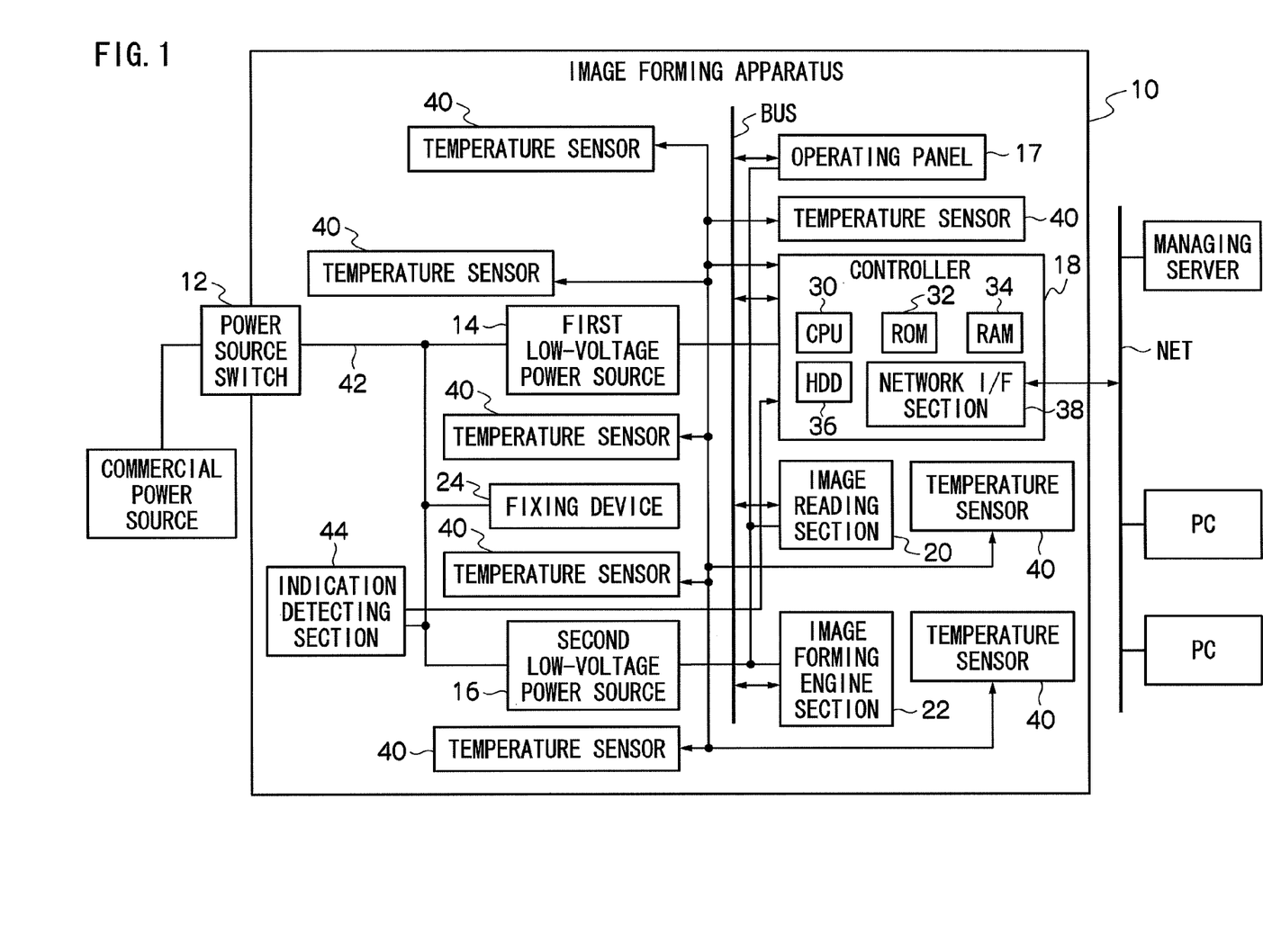
FIG. 1 is a block diagram illustrating the schematic configuration of an image forming apparatus according to a first exemplary embodiment.

FIG. 1 illustrates a block diagram illustrating the schematic configuration of an image forming apparatus 10, according to a first exemplary embodiment.

The image forming apparatus 10 according to the first exemplary embodiment includes a power source switch 12, a first low-voltage power source device 14, a second low-voltage power source device 16, an operating panel 17, a controller 18, an image reading section 20, an image forming engine section 22, and a fixing device 24. The power source switch 12 is connected to a commercial power source (e.g., 100-V AC) and switches the commercial power source ON and OFF. Accordingly, the power source switch 12 switches the power, supplied from the commercial power source, between a current-carrying state and a non-current-carrying state. The first low-voltage power source device 14 connected to the power source switch 12, converts the power, supplied from the commercial power source via the power source switch 12, to DC power at a first voltage level (e.g., 5 V). The second low-voltage power source device 16 connected to the power source switch 12, converts the power, supplied from the commercial power source via the power source switch 12, to DC power at a second voltage level (e.g., 24 V). The operating panel 17 includes a display section that displays various messages and operating buttons that inputs various operating instructions, such as a copy operation. The controller 18 controls the operation of the entire apparatus. The image reading section 20 reads an image from a recording sheet placed in a reading position, to obtain image data that presents the image. The image forming engine section 22 forms a latent image on a photosensitive drum by an electrophotographic system according to the image data, and transfers a toner image, developed by allowing toner to adhere onto the formed latent image, onto the recording sheet. The fixing device 24 fixes the toner image, transferred onto the recording sheet, onto the recording sheet, by heating and pressing.

The fixing device 24 is connected to the power source switch 12 and is supplied with power from the commercial power source via the power source switch 12. The controller 18 is connected to the first low-voltage power source device 14 and is supplied with power from the first low-voltage power source device 14. The operating panel 17, the image reading section 20, and the image forming engine section 22 are connected to the second low-voltage power source device 16. Power is supplied from the second low-voltage power source device 16 to the operating panel 17, the image reading section 20, and the image forming engine section 22.

The controller 18 includes a CPU (central processing unit) 30, a ROM 32, a RAM 34, an HDD (hard disk drive) 36, and a network I/F (interface) section 38. The CPU (central processing unit) 30 controls the operation of the entire apparatus. The ROM 32 stores various programs including a control program. The RAM 34 temporarily stores various data. The HDD (hard disk drive) 36 stores and holds various data. The network I/F (interface) section 38 is connected to a network NET and transmits and receives communication data between the network I/F (interface) section 38 and an external device via the network NET.

The operating panel 17, the controller 18, the image reading section 20, and the image forming engine section 22 are interconnected via a BUS. Therefore, the controller 18 can control the operations of the image reading section 20 and the image forming engine section 22. Further, the controller 18 can detect that the operating buttons provided in the operating panel 17 are operated by the user. Furthermore, the controller 18 controls the display section provided in the operating panel 17 to display a message.

The image forming apparatus 10 according to the first exemplary embodiment includes temperature sensors 40 at target portions at which an occurrence of the abnormality caused by high temperature is to be detected. In the first exemplary embodiment, as the target portions to be detected, as illustrated in FIG. 1, the temperature sensors 40 are provided in the arranged positions of various devices, such as the first low-voltage power source device 14, the second low-voltage power source device 16, the operating panel 17, the image reading section 20, the image forming engine section 22, the fixing device 24, and a wire 42 and in the upper and lower sections of the apparatus. However, the above target portions are not limited thereto. Each of the temperature sensors 40 is connected to the controller 18. Each of the temperature sensors 40 detects the temperature of the target portion by the control from the controller 18. The controller 18 detects whether the abnormality due to high temperature has occurred, according to the temperature detected by each of the temperature sensors 40 in each of the target portions.

The image forming apparatus 10 according to the first exemplary embodiment includes an indication detecting section 44 that detects the indication of the occurrence of an abnormality due to high temperature. The indication detecting section 44 is connected to the wire 42 to which power is supplied from the power source switch 12.

Here, when abnormality due to high temperature occurs, a waveform abnormality such as spike voltage, voltage lowering, or current lowering occurs as an indication, in a voltage waveform and a current waveform in the power supplied via the wire 42.

Figure 2:
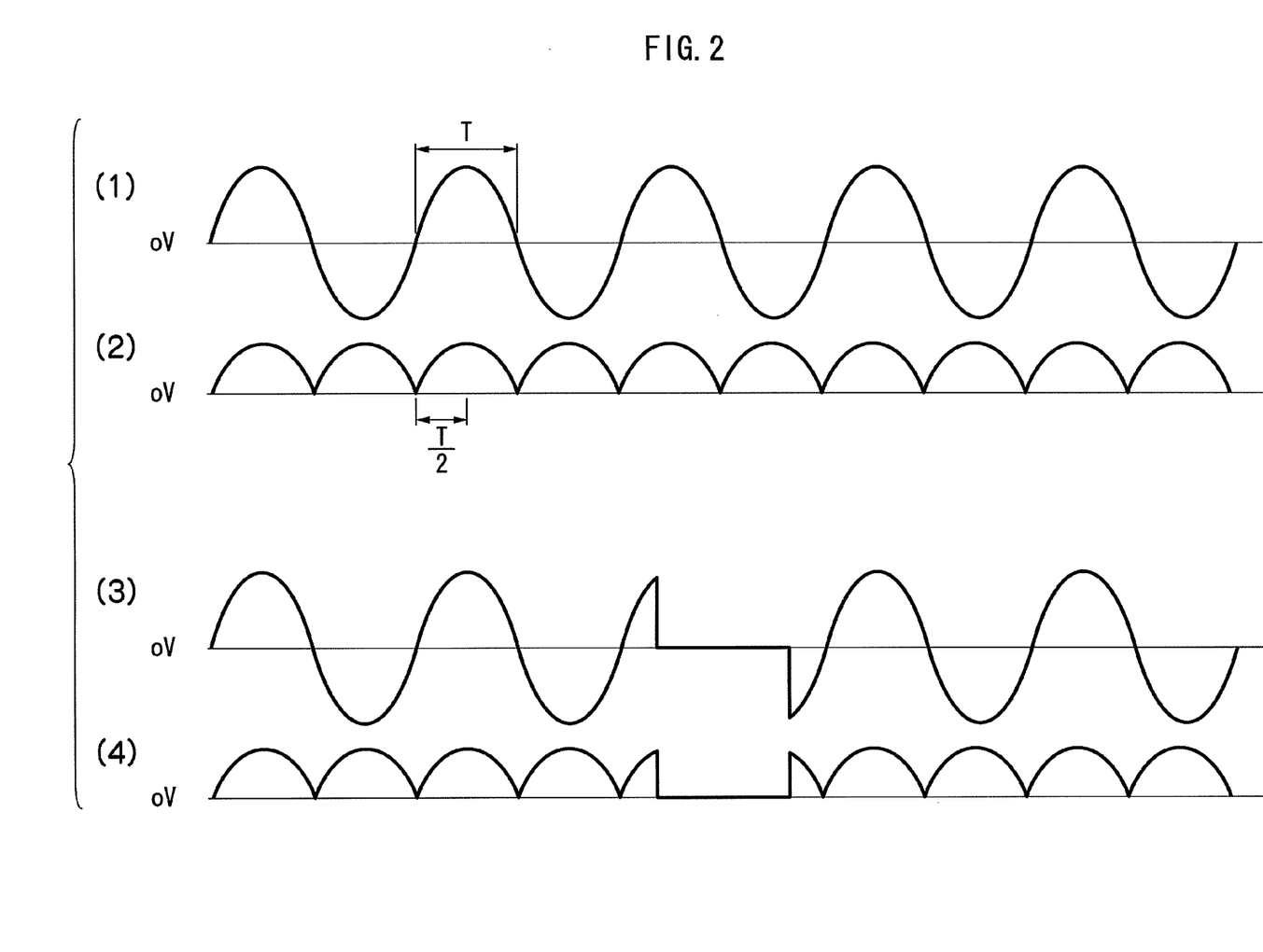
FIG. 2 is waveform diagrams illustrating examples of voltage waveforms according to the exemplary embodiment.

(1) of FIG. 2 illustrates the voltage waveform of the power supplied via the wire 42. (2) of FIG. 2 illustrates a resulting voltage waveform of the full-wave rectified voltage waveform of (1) of FIG. 2. (3) of FIG. 2 illustrates a voltage waveform when the voltage lowering occurs. (4) of FIG. 2 illustrates a resulting voltage waveform of the full-wave rectified voltage waveform of (2) of FIG. 2.

The indication detecting section 44 detects a zero cross point (a 0-V point) of the supplied AC power to determine a period T, and detects the abnormality in the voltage waveform. The abnormality in the voltage waveform can be detected, by, for example, full-wave rectifying the supplied AC power using a diode bridge or the like, and determining a voltage value over a period T/2 that starts from the zero cross point of the full-wave rectified voltage waveform. The indication detecting section 44 is connected to the controller 18. When the indication detecting section 44 detects the abnormality, the indication section 44 notifies the occurrence of an abnormality in a voltage waveform. The controller 18 detects whether the abnormality in the voltage waveform of the power supplied has occurred, according to the notification from the indication detecting section 44.

Hereafter, the operation of the image forming apparatus 10 according to the first exemplary embodiment will be described.

The controller 18 periodically detects the temperature by each of the temperature sensors 40. Next, the controller 18 detects whether an abnormality due to high temperature has occurred, according to the temperature detected by each of the temperature sensor 40 in each of the target portion.

The indication detecting section 44 detects the abnormality of the voltage waveform in the supplied power. When the waveform abnormality is detected, the indication detecting section 44 notifies to the controller 18 that the waveform abnormality has occurred, as an indication of the occurrence of an abnormality due to high temperature.

The controller 18 changes a temperature detection frequency according to result of the indication detection and the result of the temperature detection in the temperature sensors 40.

Figure 3:
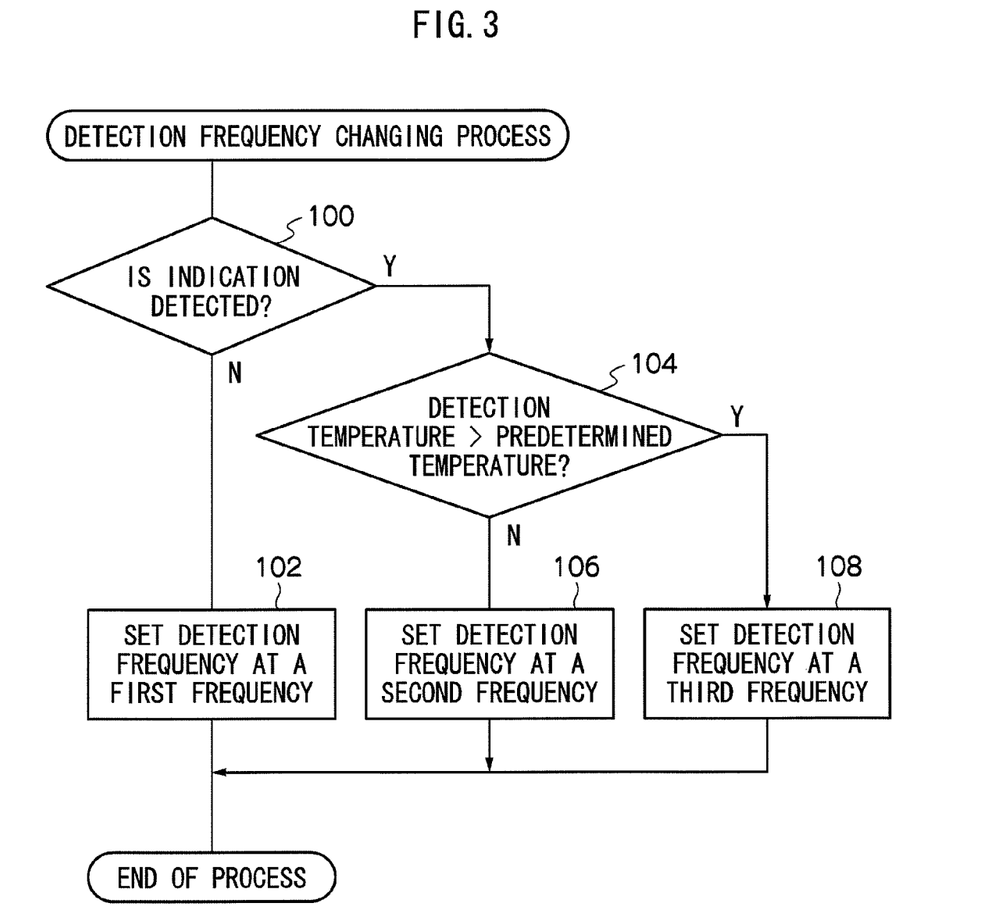
FIG. 3 is a flowchart illustrating the flow of the process of a detection frequency changing process program, according to the first exemplary embodiment.

FIG. 3 illustrates a flowchart showing the flow of the process of a detection frequency changing process program, executed by the CPU 30 of the controller 18. The program is stored in a predetermined region of the ROM 32. The program is executed by the CPU 30 in every fixed period and at a timing when the setting of the temperature detection frequency needs to be changed (e.g., at a timing when the image forming apparatus 10 is started, when the abnormality of the voltage waveform is detected by the indication detecting section 44, or when occurrence of the temperature abnormality is detected by any one of the temperature sensors 40).

In step 100, it is determined whether the number of times the indication of the occurrence of an abnormality due to high temperature detected, within a predetermined period (here, within three minutes), is more than a predetermined number of times (here, ten times). If affirmative determination is made in step 100, the process proceeds to step 104. If negative determination is made in step 100, the process proceeds to step 102.

In the first exemplary embodiment, when the number of times the indication detected within the predetermined period is more than the predetermined number of times, it is determined that the indication of abnormality due to high temperature has occurred. The predetermined period and the predetermined number of times are previously determined by a computer simulation, according to an experiment using real devices and the design specifications of the image forming apparatus 10. Note that, other to the indication of the abnormality due to high temperature, the waveform abnormality in the voltage waveform in the power supplied via the wire 42 occurs due to surge such as a thunder or the like. Further, note that, the waveform abnormality due to a surge such as a thunder or the like, and the waveform abnormality due to high temperature, has the same occurrence frequency.

In step 102, the temperature detection frequency of each of the temperature sensors 40 is set at predetermined first frequency (here, once in every three seconds).

In step 104, it is determined whether the temperature detected by any of the temperature sensor 40 has become more than the predetermined temperature (here, 70° C.), the temperature for determining the occurrence of abnormality due to high temperature. If affirmative determination is made in step 104, the process proceeds step 108. On the other hand, if negative determination is made in step 104, the process proceeds step 106.

In step 106, the temperature detection frequency for each temperature sensor 40 is set at second frequency (here, 2 times every one second) which is higher than the first frequency.

In step 108, the temperature detection frequency for each temperature sensor 40 is set at third frequency (here, ten times every one second) which is higher than the second frequency.

The controller 18 performs the temperature detection by each temperature sensor 40, at the frequency determined by the detection frequency changing process program. The controller 18 detects whether the abnormality due to high temperature has occurred, in accordance to the temperature detected by each temperature sensor 40 in each target portion. The controller 18 stores the detection result in the HDD 36. In this manner, the image forming apparatus 10, according to the first exemplary embodiment, stores the result of the temperature detection for each temperature sensor 40 in the HDD 36. Note that, the detection results stored in the HDD 36 may be periodically deleted after an elapse of predetermined period.

When it is determined that the abnormality due to high temperature has occurred, the controller 18 displays a message stating that the abnormality due to high temperature has occurred, on the display section of the operating panel 17, to notify the user.

Figure 4:
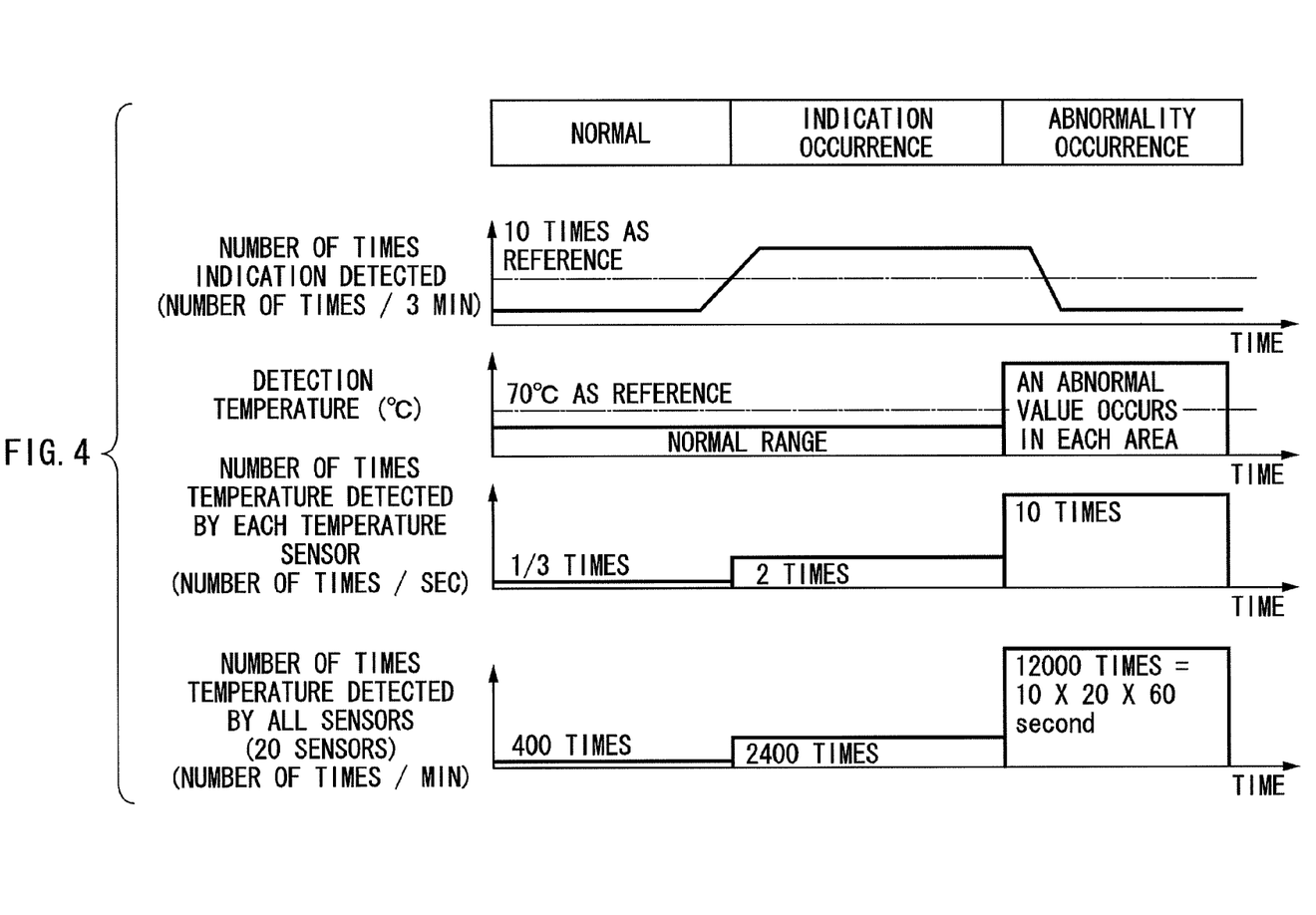
FIG. 4 is a diagram illustrating the relation between indication results and temperature detection frequencies when an indication is detected and thereafter an occurrence of an abnormality due to high temperature is detected according to the first exemplary embodiment.

FIG. 4 illustrates the relation between indication results and temperature detection frequencies when the indication form the indication detecting section 44 is detected and thereafter the occurrence of an abnormality due to high temperature is detected.

When the number of times the indication detected within three minutes is less than ten times, each of the temperature sensors 40 performs the temperature detection once in every three seconds. For example, if 20 temperature sensors 40 are provided, the detection frequency within one minute becomes 400 times (=(⅓)20×60 [second]).

Further, if the number of times the indication detected within three minutes is more than ten times, each of the temperature sensors 40 performs the temperature detection 2 times every in one second. Accordingly, for example, if 20 temperature sensors 40 are provided, the detection frequency within one minute becomes 2400 times (=2×20×60 [second]).

Furthermore, if the temperature detected by the temperature sensor 40 is more than 70° C. and the abnormality due to high temperature has occurred, each temperature sensor 40 performs temperature detection ten times in every one second. Accordingly, for example, if 20 temperature sensors 40 are provided, the detection frequency within one minute becomes 12000 times (=10×20×60 [second]).

In normal state where no abnormality due to high temperature has occurred, the temperature detection frequency of the temperature sensor 40 can be reduced. On the other hand, if the temperature detection frequency of the temperature sensor 40 is reduced, the temperature sensor 40 may deform and melt when an abnormality due to high temperature occurs before it can perform temperature detection, and as a result the temperature detection may not be performed. However, according to the first exemplary embodiment, if the indication of the occurrence of an abnormality due to high temperature is detected, the image forming apparatus 10 increases the temperature detection frequency of the temperature sensor 40.

Figure 5:
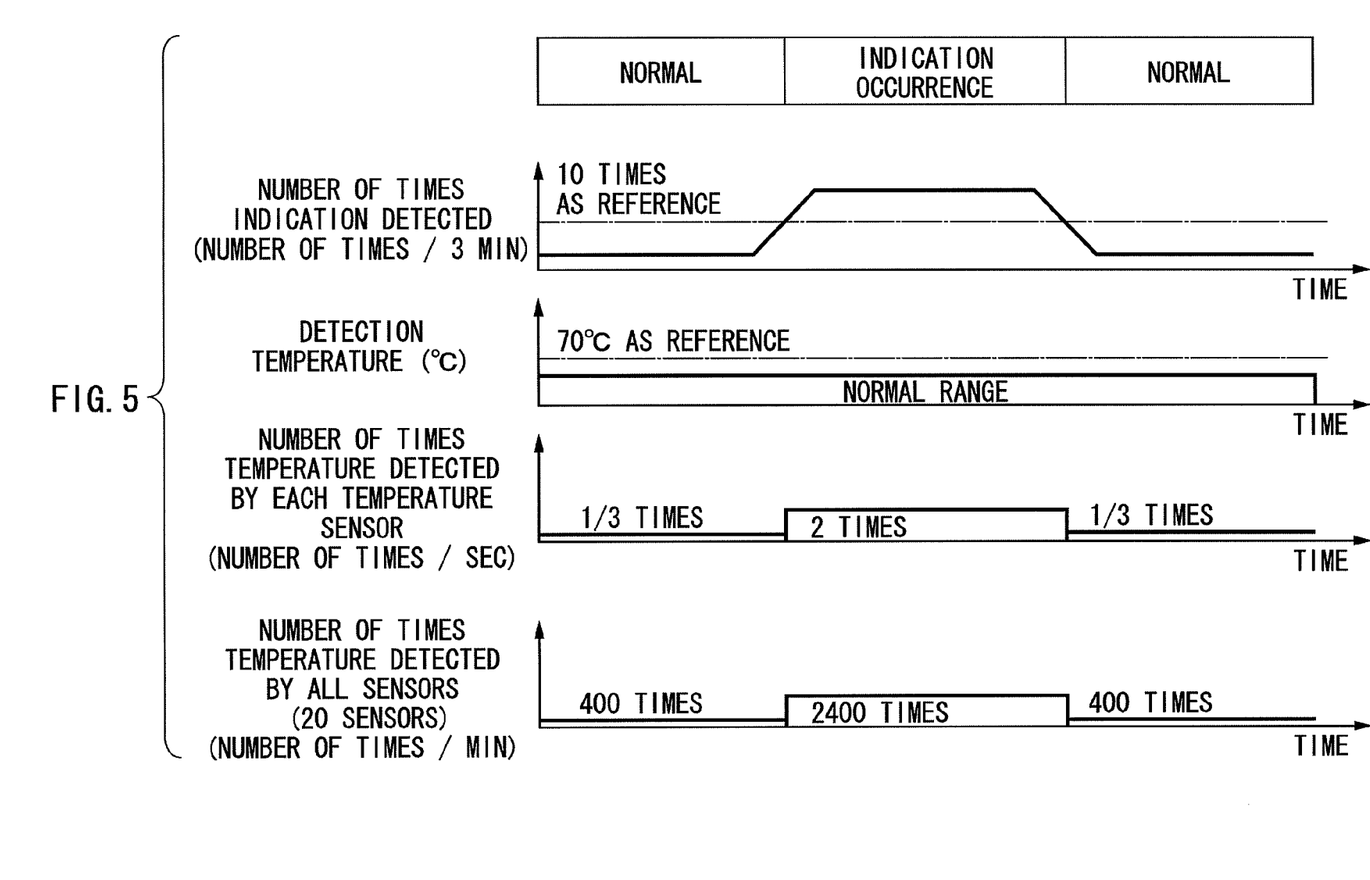
FIG. 5 is a diagram illustrating the relation between indication results and temperature detection frequencies when an indication is not detected following the detection of an indication, according to the first exemplary embodiment.

FIG. 5 illustrates the relation between indication results and temperature detection frequencies when an indication is not detected following detection of an indication.

When the number of times the indication detected within three minutes is more than ten times, each temperature sensor 40 performs temperature detection 2 times in every one second. Accordingly, for example, if 20 temperature sensors 40 are provided, the detection frequency within one minute becomes 2400 times (=2×20×60 [second]).

When the number of times the indication detected within three minutes is less than ten times, each temperature sensor 40 performs the temperature detection once in every three seconds. Accordingly, for example, if 20 temperature sensors 40 are provided, the detection frequency within one minute becomes 400 times (=(⅓)×20×60 [second][second]).

When the indication of the occurrence of an abnormality due to high temperature is not detected and the waveform abnormality of the voltage waveform due to surge is eliminated, the image forming apparatus 10 according to the first exemplary embodiment reduces the detection frequency to the normal first frequency.

Figure 10:
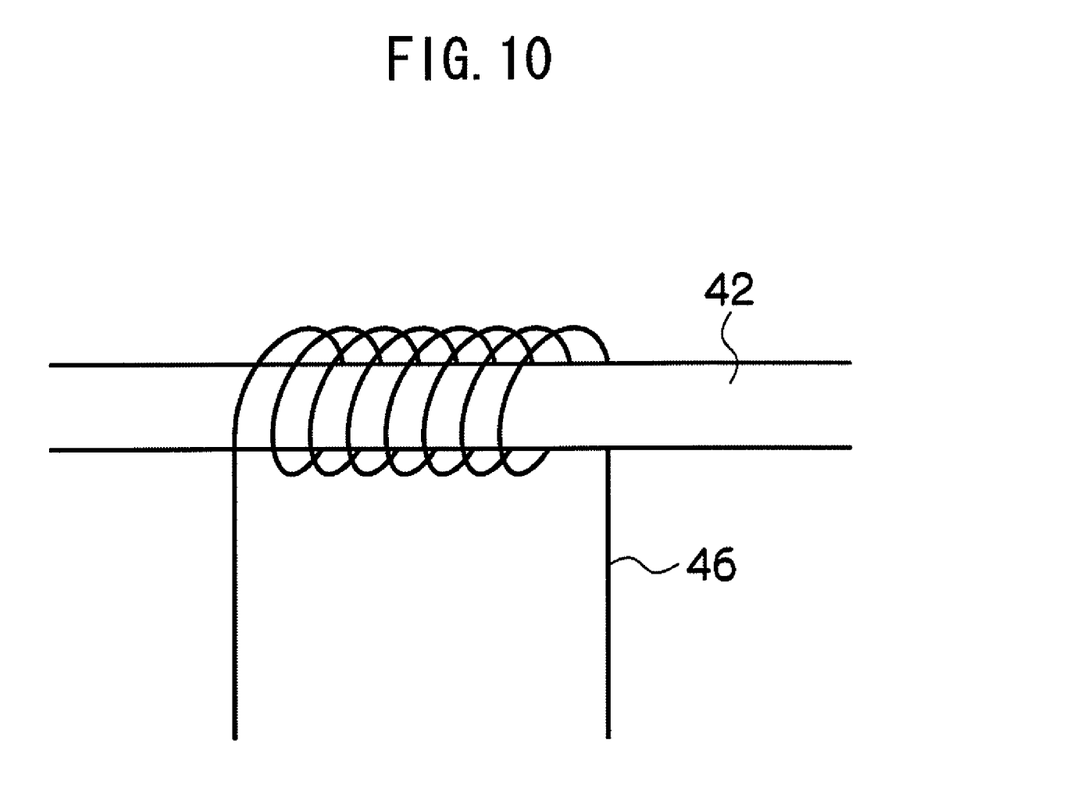
FIG. 10 is a diagram illustrating an example of the configuration of a detection section that detects an electric current waveform, according to another exemplary embodiment.

In the first exemplary embodiment, the indication detecting section 44 detects the abnormality of the voltage waveform, to detect the indication of the occurrence of an abnormality due to high temperature. However, the invention is not limited thereto. For example, the indication detecting section 44 may detect the abnormality of a current waveform. As illustrated in FIG. 10, the current waveform may be determined by winding a coil 46 around the wire 42, to detect a voltage caused in the coil 46 by the change of the electric current flowed in the wire 42. A resistor may be provided in the wire 42 to determine the current waveform, from a potential difference between both ends of the resistor.

Second Exemplary Embodiment

Figure 6:
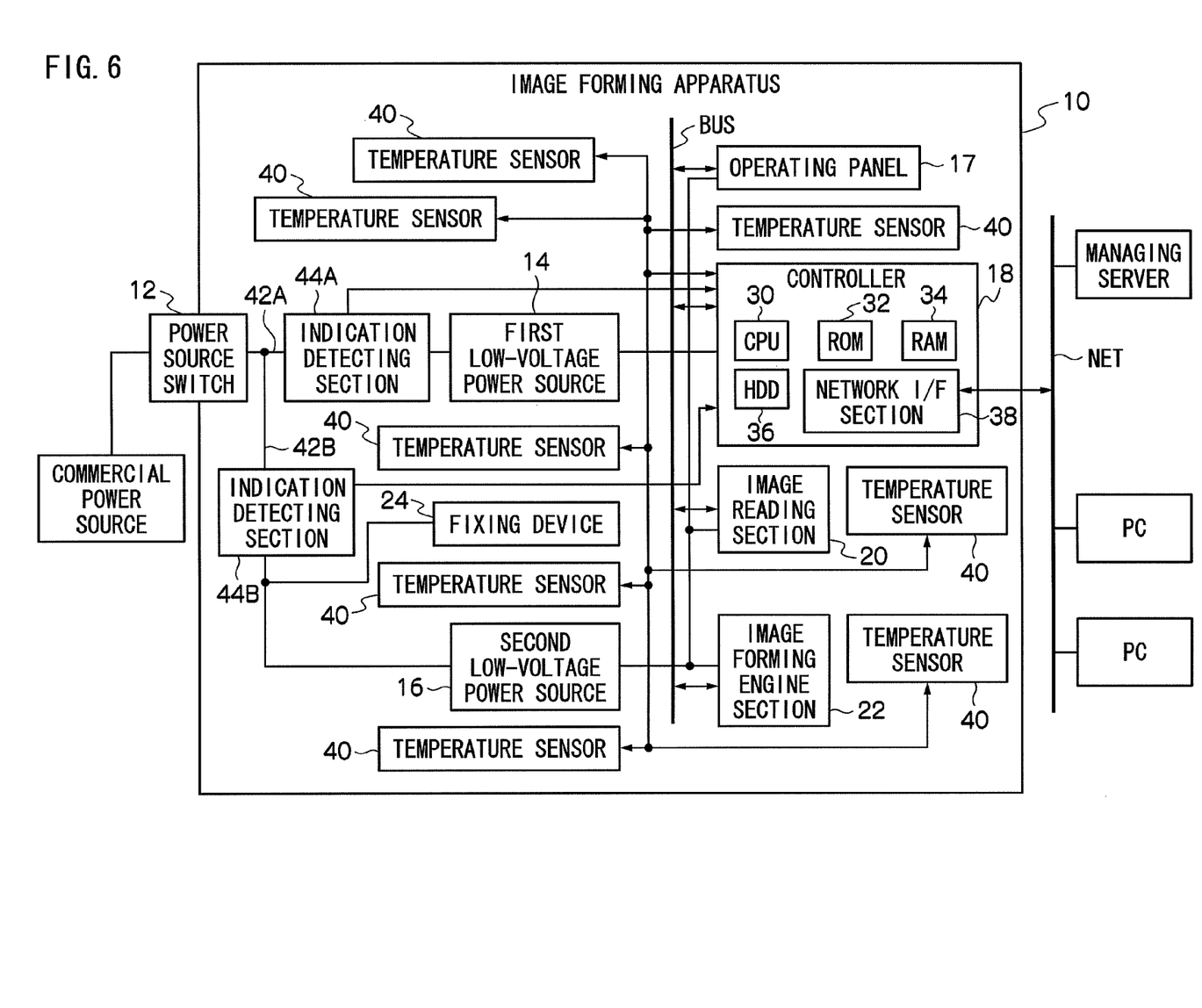
FIG. 6 is a block diagram illustrating the schematic configuration of the image forming apparatus, according to a second exemplary embodiment.

FIG. 6 is a block diagram illustrating the schematic configuration of the image forming apparatus 10 according to a second exemplary embodiment. The same sections as the first exemplary embodiment (see FIG. 1) are indicated by the same reference and the description thereof is omitted.

The image forming apparatus 10 according to the second exemplary embodiment includes indication detecting sections 44A and 44B. The indication detecting sections 44A and 44B are connected to the controller 18. The indication detecting section 44A detects the abnormality of a current waveform in a wire 42A in which power is supplied from the power source switch 12 to the first low-voltage power source device 14. The indication detecting section 44B detects the abnormality of a current waveform in a wire 42B in which power is supplied from the power source switch 12 to the second low-voltage power source device 16 and the fixing device 24. The controller 18 detects whether abnormality has occurred in the current waveform in the supplied power to the first low-voltage power source device 14 and the current waveform in the supplied power to the second low-voltage power source device 16 and the fixing device 24. Hereafter, the indication detecting sections 44A and 44B may simply be called the indication detecting section 44.

In the image forming apparatus 10 according to the second exemplary embodiment, the HDD 36 of the controller 18 stores sensor arrangement information that shows the arranged positions of the temperature sensors 40, arranged around the indication detecting sections 44A and 44B.

The indication detecting sections 44A and 44B detect the abnormality in the current waveforms in the supplied power. Therefore, when the abnormality is detected, the indication detecting sections 44A and 44B notify that the abnormality has occurred to the controller 18.

The controller 18 changes and increases the temperature detection frequency of the temperature sensor 40 that are arranged around the indication detecting section 44 that has detected an indication.

Figure 7:
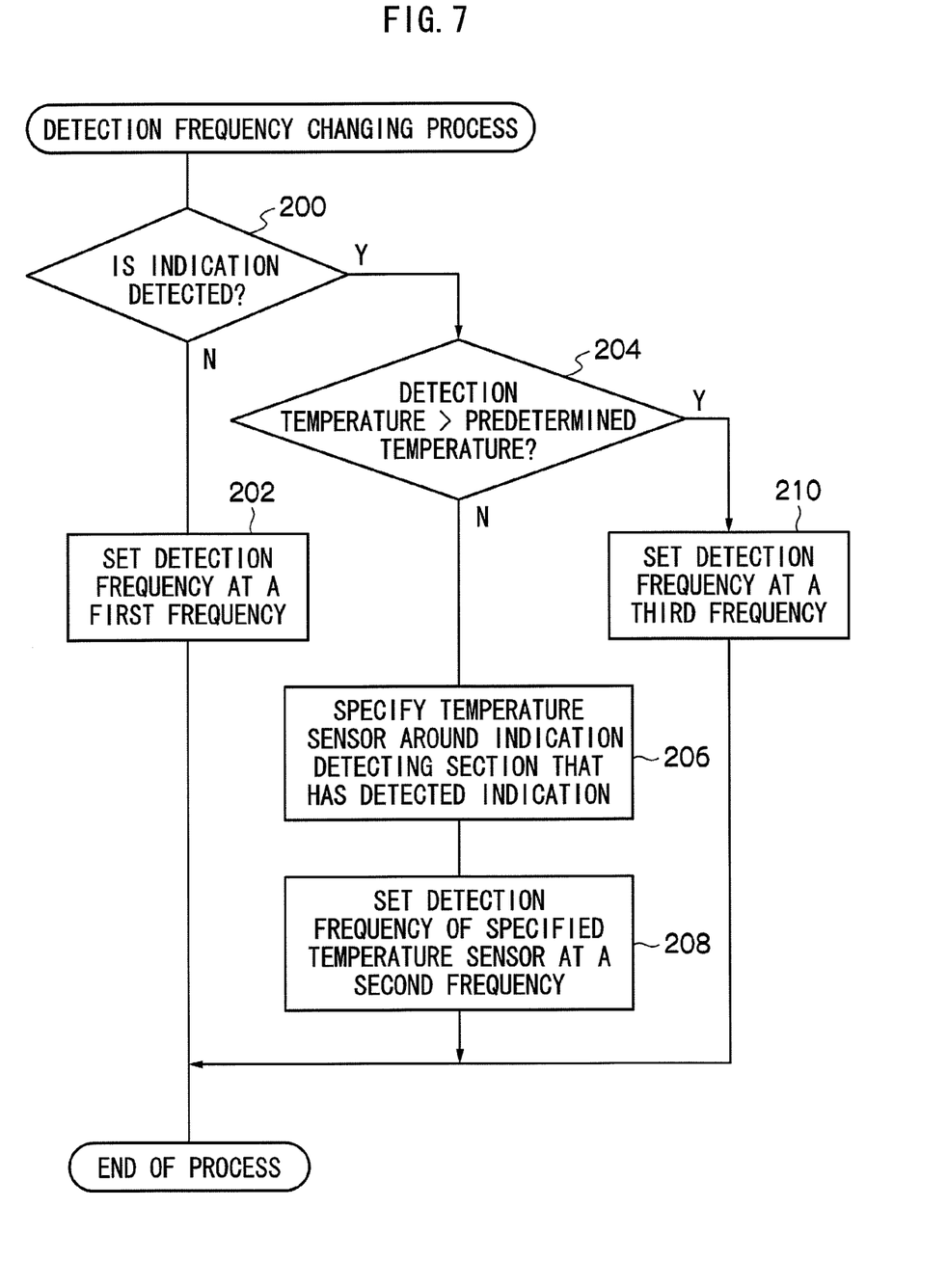
FIG. 7 is a flowchart illustrating the flow of the process of a detection frequency changing process program, according to the second exemplary embodiment.

FIG. 7 illustrates a flowchart showing the flow of the process of the detection frequency changing process program, according to the second exemplary embodiment.

In step 200, it is determined whether the number of times indication detected by any of the indication detecting sections 44A and 44B, within a predetermined period (here, within three minutes), is more than a predetermined number of times (here, ten times). If affirmative determination is made in step 200, the process proceeds step 204. On the other hand, if negative determination is made in step 200, the process proceeds step 202.

In step 202, the temperature detection frequency of each temperature sensor 40 is set at a predetermined first frequency (here, once in every three seconds).

In step 204, it is determined whether the temperature detected by any of the temperature sensors 40 is more than the predetermined temperature (here, 70° C.), the temperature for determining the occurrence of abnormality due to high temperature. If affirmative determination is made in step 204, the process proceeds step 210. On the other hand, if negative determination is made in step 204, the process proceeds step 206.

In step 206, the temperature sensor 40 arranged around the indication detecting section 44, that has detected the indication, is specified according to the sensor arrangement information stored in the HDD 36.

In next step 208, the temperature detection frequency of the temperature sensor 40 specified in step 206 is set at a second frequency (here, 2 times in every one second).

In step 210, the temperature detection frequency of each of the temperature sensors 40 is set at a third frequency (here, ten times in every one second).

Figure 8:
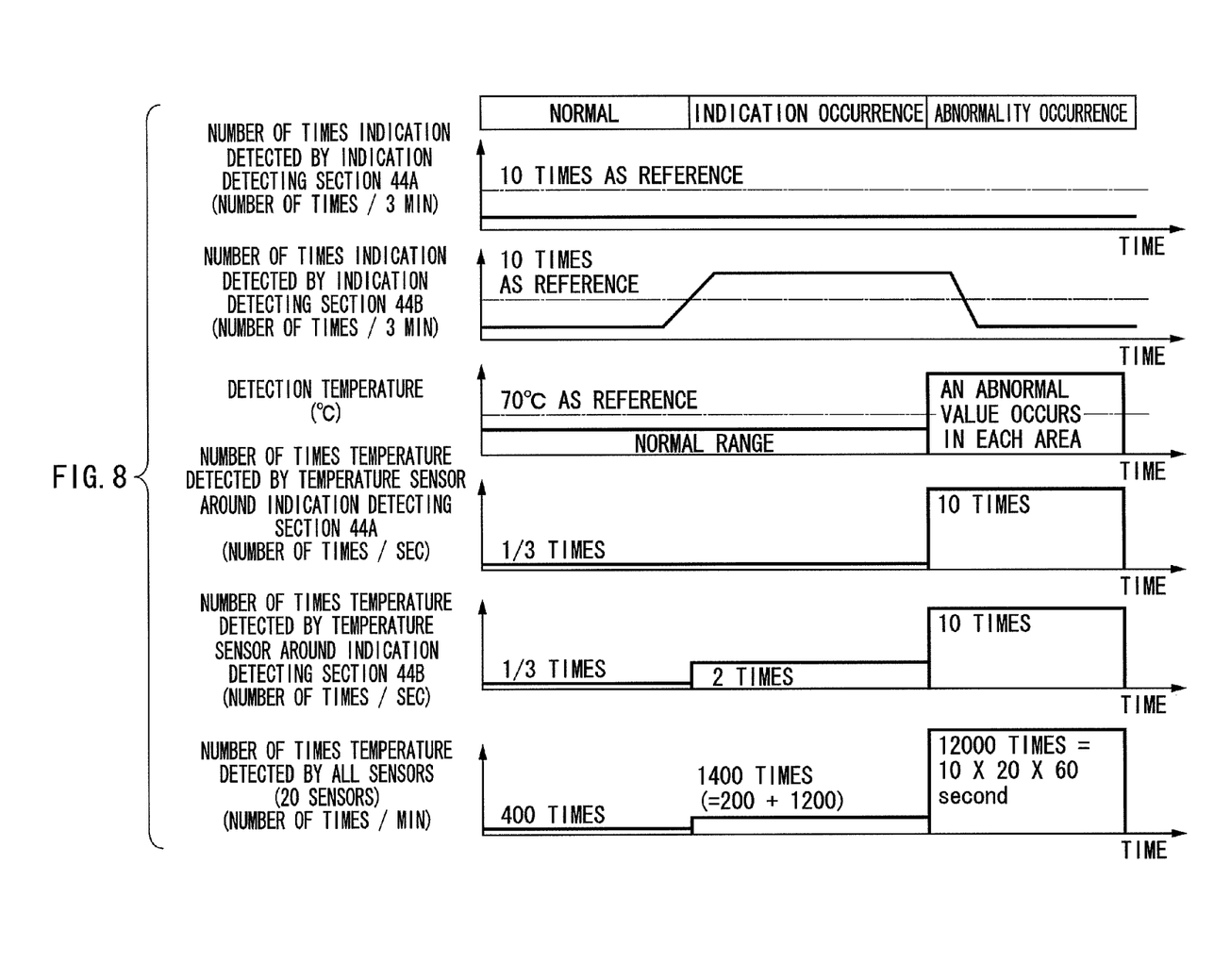
FIG. 8 is a diagram illustrating the relation between indication results and temperature detection frequencies when abnormality occurs due to high temperature is detected after an indication is detected, according to the second exemplary embodiment.

FIG. 8 illustrates the relation between indication results and temperature detection frequencies detected by the indication detecting sections 44A and 44B, when the occurrence of an abnormality caused by high temperature is detected after an indication is detected by the indication detecting section 44B.

If the number of times indication detected by the indication detecting sections 44A and 44B within three minutes is less than ten times, each temperature sensor 40 performs temperature detection once in every three seconds. Accordingly, for example, if 10 temperature sensors 40 (a total of 20 temperature sensors 40) are provided around each of the indication detecting sections 44A and 44B, the detection frequency within one minute becomes 400 times (=(⅓)×20×60 [second]).

If the number of times indication detected by the indication detecting section 44B within three minutes is more than ten times, the temperature sensor 40 arranged around the indication detecting section 44B performs temperature detection 2 times in every one second. Accordingly, for example, if 10 temperature sensors 40 (a total of 20 temperature sensors 40) are provided around each indication detecting sections 44A and 44B, the detection frequency of the temperature sensors 40 around the indication detecting section 44B becomes 1200 times (=2×10×60 [second]). On the other hand, the detection frequency of the temperature sensors 40 around the indication detecting section 44A is 200 times (=(⅓)×10×60 [second]). Accordingly, the total detection frequency becomes 1400 times (=2×20×60 [second]).

Further, if the temperature detected by the temperature sensor 40 is more than 70° C. and the abnormality due to high temperature has occurred, each of the temperature sensors 40 performs temperature detection ten times in every one second. Accordingly, for example, if 20 temperature sensors 40 are provided, the detection frequency within one minute becomes 12000 times (=10×20×60 [second]).

Namely, if the indication of the occurrence of an abnormality due to high temperature is detected, the image forming apparatus 10 according to the second exemplary embodiment increases the temperature detection frequency of the temperature sensor 40 that are positioned around the indication detecting section 44 that has detected the indication.

Figure 9:
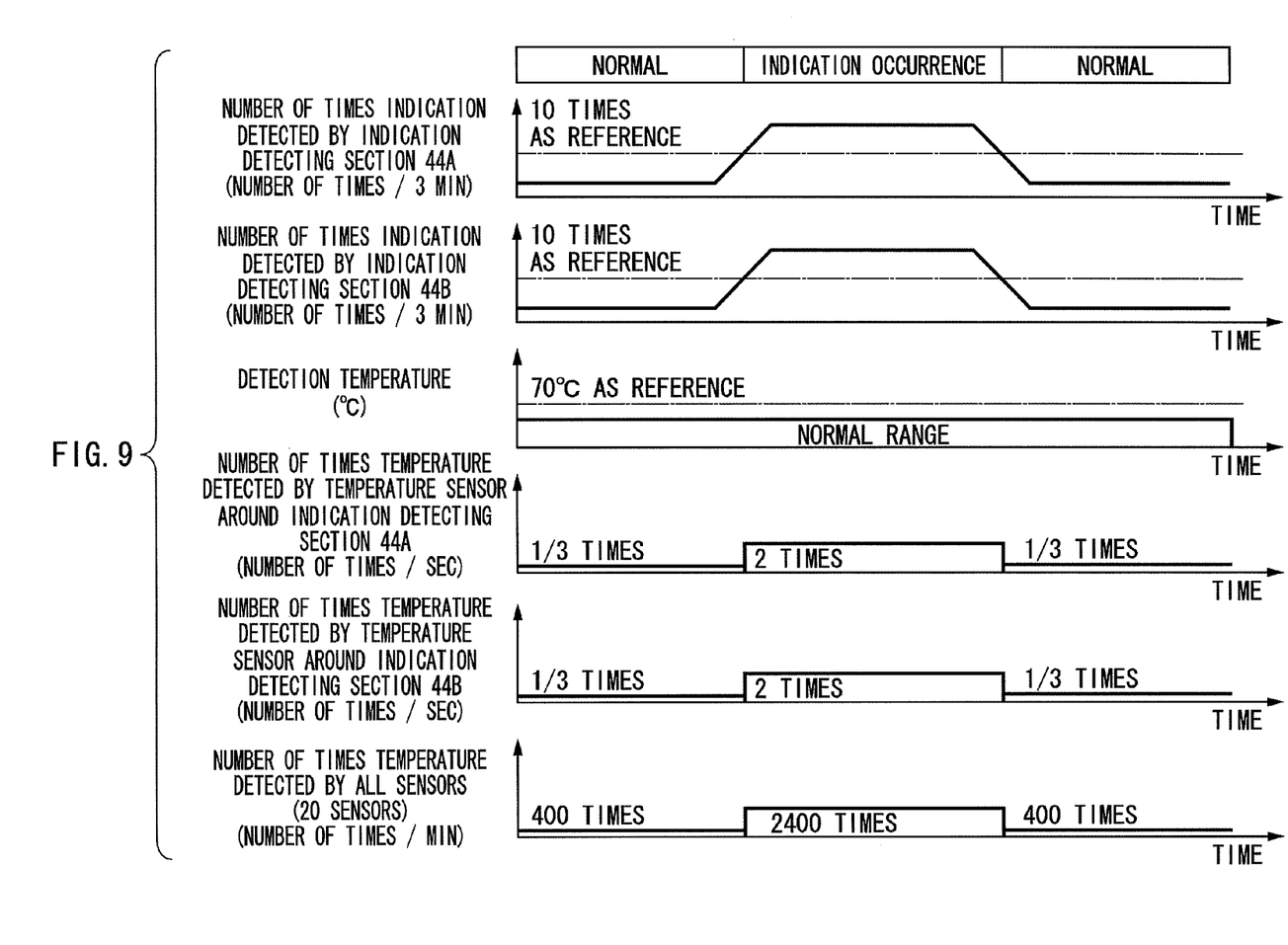
FIG. 9 is a diagram illustrating the relation between indication results and temperature detection frequencies when an indication is not detected following the detection of an indication, according to the second exemplary embodiment.

FIG. 9 illustrates the relation between indication results and temperature detection frequencies when the indication is not detected, after indication is detected by the indication detecting sections 44A and 44B.

If the number of times indication detected by the indication detecting sections 44A and 44B within three minutes is more than ten times, the temperature sensors 40 arranged around the indication detecting sections 44A and 44B perform temperature detection 2 times in every one second. Accordingly, for example, if 10 temperature sensors 40 (a total of 20 temperature sensors 40) are provided around each of the indication detecting sections 44A and 44B, the detection frequency within one minute becomes 2400 times (=2×20×60 [second]).

If the number of times indication detected by the indication detecting sections 44A and 44B within three minutes is less than ten times, each of the temperature sensors 40 performs temperature detection once in every three seconds. Accordingly, for example, if 20 temperature sensors 40 are provided, the detection frequency within one minute becomes 400 times (=(⅓)×20×60 [second]).

If the indication of the occurrence of an abnormality due to high temperature is not detected, the image forming apparatus 10 according to the second exemplary embodiment reduces the detection frequency to the normal first frequency.

In the above exemplary embodiments, the indication of the occurrence of an abnormality due to high temperature is detected from the abnormality in the voltage waveform and the abnormality in the current waveform. However, the present invention is not limited thereto. For example, to detect the indication of the occurrence of an abnormality due to high temperature, smoke caused by high temperature can be detected by a smoke sensor. Further, to detect the indication of the occurrence of an abnormality due to high temperature, a deformation of a substrate due to high temperature may be detected.

In the above exemplary embodiments, the detection result of each of the temperature sensors 40 is stored in the HDD 36 and, when the abnormality due to high temperature has occurred, a message is displayed on the display section of the operating panel 17 and is then notified to the user. However, the invention is not limited thereto. The detection of the occurrence of an abnormality due to high temperature may be notified to an external device such as the managing server of a managing center via the network NET. Also, the detection result of each of the temperature sensors 40 may be transmitted to the external device such as the managing server. Further, the detection result may be notified to the user via voice signals or the like.

In the each exemplary embodiment, the invention is applied to the image forming apparatus 10. However, the present invention is not limited thereto.

The configurations of the image forming apparatus 10 described in the exemplary embodiments (see FIG. 1 and FIG. 6) are an example. Namely, they may be appropriately changed within the scope without departing from the purport of the invention.

The flows of the processes of the programs (see FIG. 3 and FIG. 7) described in the exemplary embodiments are an example. Namely, they may be appropriately changed within the scope without departing from the purport of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a plurality of abnormality detection sections provided in each of a plurality of detection target portions, that detect an abnormality caused by high temperature at a predetermined first frequency;
   an indication detecting section that detects an indication that the abnormality will occur; and
   a controller that controls to set the detection frequency of the plurality of abnormality detection sections to a second frequency which is higher than the first frequency, when the number of times that the indication is detected within a predetermined period is more than a predetermined number of times.

2. The information processing apparatus of claim 1, wherein the indication of the abnormality is at least one of an abnormality in a voltage waveform or an abnormality in a current waveform of a power supplied from outside the information processing apparatus.

3. The information processing apparatus of claim 1, wherein the controller controls to set the detection frequency of the plurality of abnormality detection sections to a third frequency which is higher than the second frequency, when the occurrence of the abnormality is detected by any of the abnormality detection sections.

4. The information processing apparatus of claim 2, wherein the controller controls to set the detection frequency of the plurality of abnormality detection sections to a third frequency which is higher than the second frequency, when an occurrence of the abnormality is detected by any of the abnormality detection sections.

5. The information processing apparatus of claim 1, wherein the controller controls to reduce the detection frequency of the plurality of abnormality detection sections to the first frequency, when the number of times the indication is detected by the indication detecting section within the predetermined period is less than the predetermined number of times.

6. The information processing apparatus of claim 1, further comprising:
   a plurality of indication detecting sections,
   wherein, when the indication is detected by any of the indication detecting sections, the controller controls to set the detection frequency of an abnormality detection section near to the indication detecting section that has detected the indication to the second frequency.

7. A method for controlling an information processing apparatus including a plurality of abnormality detection sections provided in each of a plurality of detection target portions, and an indication detecting section that detects an indication of the abnormality, the method comprising:
   detecting an occurrence of an abnormality caused by high temperature at a predetermined first frequency;
   detecting an indication that the abnormality will occur; and
   changing the frequency of detection of the occurrence of the abnormality to a second frequency which is higher than the first frequency, when the number of times that the indication is detected within a predetermined period is more than a predetermined number of times.

8. A non-transitory computer readable medium that stores a program causing a computer to execute a process for controlling an information processing apparatus including a plurality of abnormality detection sections provided in each of a plurality of detection target portions, and an indication detecting section that detects a indication of the abnormality, the process comprising:
   detecting an occurrence of an abnormality caused by high temperature at a predetermined first frequency;
   detecting an indication that the abnormality will occur; and
   changing the frequency of detection of the occurrence of the abnormality to a second frequency which is higher than the first frequency, when the number of times that the indication is detected within a predetermined period is more than a predetermined number of times.

* * * * *